United States Patent [19]

Piller et al.

[11] Patent Number: 5,129,751
[45] Date of Patent: Jul. 14, 1992

[54] REPLACEABLE STRUCTURAL UNIT FOR A PRINTER

[75] Inventors: Gerhard Piller, Allensbach; Michael Schwarzbauer, Konstanz, both of Fed. Rep. of Germany

[73] Assignee: Computer Gesellschaft Konstanz mbH, Fed. Rep. of Germany

[21] Appl. No.: 574,495

[22] Filed: Aug. 22, 1990

Related U.S. Application Data

[63] Continuation of Ser. No. 249,839, Sep. 27, 1988, abandoned.

[30] Foreign Application Priority Data

Sep. 28, 1987 [DE] Fed. Rep. of Germany ....... 3732662

[51] Int. Cl.$^5$ .............................................. B41J 29/02
[52] U.S. Cl. .................................. 400/692; 400/208; 400/629
[58] Field of Search ............... 400/654, 656, 657, 692, 400/88, 120, 193, 208, 234, 235.1, 582, 583.3, 616.3, 624, 625, 629, 651, 655

[56] References Cited

U.S. PATENT DOCUMENTS

| 4,428,695 | 1/1984 | Jamieson | 400/208 |
| 4,636,100 | 1/1987 | Fujisawa | 400/616.3 |
| 4,750,881 | 6/1988 | Kikuchi et al. | 400/692 |

FOREIGN PATENT DOCUMENTS

| 47685 | 3/1982 | Japan | 400/208 |
| 206692 | 10/1985 | Japan | 400/208 |
| 219081 | 11/1985 | Japan | 400/208 |
| 255470 | 12/1985 | Japan | 400/208 |
| 68276 | 4/1986 | Japan | 400/208 |
| 83077 | 4/1986 | Japan | 400/208 |
| 248774 | 11/1986 | Japan | 400/208 |
| 151374 | 7/1987 | Japan | 101/2 |
| 297159 | 12/1987 | Japan | 400/692 |

OTHER PUBLICATIONS

*IBM Tech. Disc. Bull;* vol. 23, No. 9, p. 4298; W. Crooks et al.; *Cassette Containing Both Ribbon and Print Head;* Feb. 1981.

*Primary Examiner*—David A. Wiecking
*Attorney, Agent, or Firm*—Hill, Van Santen, Steadman & Simpson

[57] ABSTRACT

The printer device is fashioned as an independent structural unit and is arranged such that the printer head is situated in front of a cooperating platen that is seated such next to the deflection roller that does not cover the full width of the document in the document processing means that its apex line facing toward the printer head proceeds in alignment with a corresponding apex line of the deflection roller. The structural unit is held in guide elements and is removable from the printing position tangentially relative to the apex line of the cooperating platen along the guide elements. A printer head operating based on the thermo transfer principle and having a thermo-inking ribbon transported synchronously with the document preferably serves as the printer device.

8 Claims, 1 Drawing Sheet

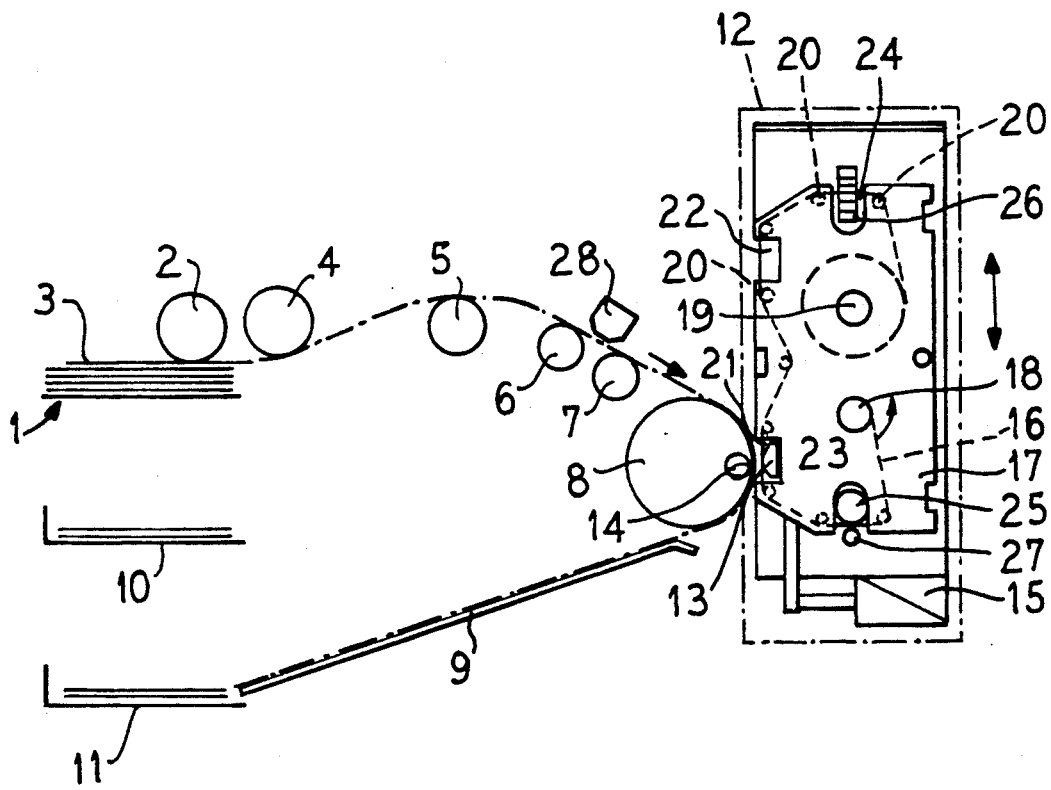

REPLACEABLE STRUCTURAL UNIT FOR A PRINTER

This is a continuation of application Ser. No. 249,839, filed Sep. 27, 1988, now abandoned.

BACKGROUND OF THE INVENTION

The invention is directed to an apparatus for printing documents in a document processing means comprising an input table for documents deposited in stacks, comprising a read means arranged in the course of the document path preceding the printer means, and comprising a deflection roller arranged following the read means for deflecting the documents into sorter pockets arranged under the input table.

Modern document processing systems comprising devices for optical character recognition are being equipped with printer devices to an increasing degree, additional data, preferably acknowledgement data, being capable of being printed with these devices. Since such printer devices must be arranged between the read means and the following stacker transport with one or more sorter pockets and little space is usually available there, integration of a printing means occasionally causes great problems. Added thereto is that the printer means must usually be serviced at regular intervals.

SUMMARY OF THE INVENTION

It is therefore an object of the present invention to fashion and arrange an apparatus for printing documents in a document processing facility such that the printer means is easily accessible and can be serviced in a simple way.

In an apparatus of the type first described above, this object is achieved wherein the printer means composed of a printer head and of a conveyor system for an inking ribbon that can be moved past at the printer head between two ribbon winding hubs is fashioned as an independent structural unit and is arranged such that the printer head of the printer device is situated in front of a cooperating platen that does not cover the full width of the document, that its apex line facing toward the printer head proceeds in alignment with a corresponding apex line in the document guide of the deflection roller; and in that the structural unit is held in guide elements and is removable from the printer device along the guide elements tangentially relative to the apex line of the cooperating platen. As a result of being fashioned as an independent structural unit that contains all component parts of the printer means except the counterplaten, the apparatus can be removed from the overall arrangement in a relatively simple way and can thus be serviced in a simple way. The arrangement of the printer device in the deflection region of the document transport path also has the advantage that the printer means can be laterally attached without engaging into the document transport path.

BRIEF DESCRIPTION OF THE DRAWINGS

An exemplary embodiment of the invention shall be set forth in greater detail below with reference to the drawing which is a schematic side view of an apparatus for printing documents embodying the principles of the present invention.

DESCRIPTION OF THE PREFERRED EMBODIMENTS

The FIGURE shows a schematic illustration of a document processing means, for example a forms-reading means comprising optical character recognition. In detail, it shows an input table 1 comprising a first single feed roller 2 that laterally draws the respectively uppermost document off from a document stack 3 that is arranged flat and is guided by a lateral detent, supplying this document to a second single feed roller 4. This second single feed roller 4 is followed by a conveying path comprising acceleration roller 5 that transfers the document to continuing conveying means. These continuing conveying means are composed of two rows of roller pairs 6, 7 proceeding parallel to one another between which an opto-electric read means 28 is provided. This is followed by a deflection roller 8 that, together with a curved outside guide plate (not shown), forwards the document to a stacker transport 9. This stacker transport 9 is pivotably seated, so that the documents can be optionally deposited into one of the two sorter pockets 10, 11. The document processing means further contains a printer means or device 12 that is fashioned as an independent structural unit and is arranged such that the print head 13 of the printer means 12 is situated in front of a cooperating platen 14. This cooperating platen 14 is composed of expanded cellular material, or of rubber or the like and is arranged next to the deflection roller 8 that does not seize or cover the document over its full width such that its apex line proceeds in alignment with a corresponding apex line in the document guidance of the deflection roller 8. The overall printer means 12 is also held in guide elements 30 and can be removed from the printing position tangentially relative to the apex line of the cooperating platen 14 along the guide elements (see the arrow).

The printer means, for example, operates based on the thermo-transfer principle wherein the print head 13 is composed of a row of thermo-printing points that are selected and heated in accord with the character code provided in the character generator. At the same time, the printing head 13 is pressed against a thermo-inking ribbon 16 with defined pressing power with the assistance of a lifter magnet 15, this thermo-inking ribbon 16 being in turn pressed against the cooperating platen 14. Due to the heating of the printing head 13, the thermo-inking ribbon 16 is heated point-by-point, whereby corresponding ink points are transferred from the thermo-inking ribbon 16 onto the paper of a document conveyed between the thermo-inking ribbon 16 and the cooperating platen 14. In comparison to other printing methods, particularly needle printing or ink-jet printing methods, the thermo-transfer principle has the advantage that it generates less noise in comparison to needle printing and that, by comparison to ink-jet printing, it is both independent of the paper quality as well as independent of the respective attitude of the integration in the device. For example, a roughly rectangular cassette 17 is provided for the transport of the thermo-inking ribbon 16, this cassette 17 comprising two ribbon winding hubs take up hub 18, haul-off hub 19 plugable onto guide arbors and the thermo-inking ribbon 16 being moved along a longitudinal edge at the printer head 13 therein via a row of deflecting rollers 20. To this end, this longitudinal edge comprises two openings 21, 22 whereof the first opening 21 is arranged in the region of the printer head 13 and the second opening 22 is arranged mirror-symmetrically relative to the opening 21 with reference to the center line proceeding between the two ribbon winding hubs 18, 19. The two roughly rectangular openings 21, 22 are thereby selected of such a size that, as may be seen with reference to the opening 21, the printer head 13 can dip into the cassette 17 behind the thermo-inking ribbon 16. Finally, respective U-shaped slotted apertures 23, 24 for a capstan drive shaft 25 and, respectively, for a light barrier 26 are provided at the two narrow sides of the cassette 17. The arrangement of the individual openings 21, 22 or, respectively, 23, 24 is expediently selected such that it can be employed in multiple operation as a turn-over cassette. The aforementioned capstan drive shaft 25 and a roller 27 that provides opposing pressure from the other side of the ribbon when inserted into the printing means 12 see to the drive of the thermo-inking ribbon 16. A slip clutch integrated in the capstan drive shaft 25 also effects that the inherently higher inked ribbon speed is adapted to the lower conveying speed of the printable document moving past the printer head 13. The drive for the ribbon winding hub 18 that takes up the inking ribbon to be wound up and is coupled to the drive of the capstan drive shaft 25 is likewise set such by a slip clutch that only an extremely slight driving torque derives for this ribbon winding hub 18. The end of the ribbon is monitored with the light barrier 26 provided in the U-shaped slotted aperture 24, whereby the position of the light barrier 26 relative to the printer head is selected such that all documents already situated on the conveying path are still printed given a report of end of ribbon before the end of the ribbon reaches the printer head 13.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An apparatus for printing documents in a document processing means, said apparatus having an input table for documents deposited in stacks, a read means arranged in the course of the document conveying path preceding a printer means, and a deflection roller arranged following the read means for deflecting the documents into sorter pockets arranged under the input table, the printer means being fashioned as an independent structural unit and comprising a printer head, an inking ribbon, a drive means for the inking ribbon, a conveyor system for the inking ribbon and two ribbon winding hubs carrying the inking ribbon, said structural unit being arranged such that the printer head of the printer means is situated in front of a cooperating platen that does not cover the full width of the document, an apex line of the cooperating platen facing toward the printer head is parallel to a horizontal axis of the platen and collinear with a corresponding apex line of the deflection roller, and said apparatus further comprising means for guiding the whole structural unit into the apparatus vertical relative to the axis of the cooperating platen and tangentially relative to the cooperating platen at the apex line.

2. An apparatus according to claim 1, wherein the conveying system for the inking ribbon is fashioned as an essentially rectangular cassette that can be put in place on guide arbors for the two ribbon winding hubs and that comprises at least one rectangular opening at a longitudinal edge facing toward the printer head for the printer head to extend into the cassette behind the inking ribbon and further comprises an opening for a capstan drive shaft that is seated preceding one of the winding hubs acting as a take up core.

3. An apparatus according to claim 2, wherein a further opening for a light barrier monitoring the end of the inking ribbon is provided in the region of the other winding hub acting as a haul-off hub.

4. An apparatus according to claim 3, wherein the openings allocated to the capstan drive shaft and to the light barrier are respectively arranged at the narrow sides of the cassette in a position that is mirror-symmetrical with reference to the center line between the two ribbon winding hubs.

5. An apparatus according to claim 4, wherein the openings for the capstan drive shaft and for the light barrier are fashioned as U-shaped slots.

6. An apparatus according to claim 1, wherein a thermo-transfer printing head having a thermo-inking ribbon is provided as the printer means.

7. An apparatus according to claim 1, wherein the cooperating platen is composed of rubber.

8. An apparatus according to claim 1, wherein said drive means comprises a capstan drive shaft for engaging one side of the inking ribbon and a roller to provide opposing pressure on an opposite side of the ribbon.

* * * * *